United States Patent Office 3,838,155
Patented Sept. 24, 1974

3,838,155
N-ARYL 5-(OR 6-) METHYLPYRID-2-ONES
Patrick J. McNulty, Wyndmoor, Horst O. Bayer, Levittown, and Michael C. Seidel, Chalfont, Pa., assignors to Rohm and Haas Company, Philadelphia, Pa.
No Drawing. Filed Aug. 17, 1972, Ser. No. 281,358
Int. Cl. C07d 31/36
U.S. Cl. 260—295.5 R      10 Claims

ABSTRACT OF THE DISCLOSURE

Novel compounds belonging to the class of 1-aryl-3-carboxy-methylpyrid-2-one. These compounds possess biological activity and in particular are plant growth regulators.

This invention is concerned with new members of the class of N-aryl methylpyrid-2-ones.

The compounds of this invention may be represented by the general formula $$\text{(I)}$$

wherein the $CH_3$ group is in the 5-position or 6-position.

Aryl is selected from the group consisting of $$-(X')_n \text{ and naphthyl}$$

wherein X is selected from the group consisting of amino, fluoro, chloro, bromo, iodo, alkyl of 1 to 5 carbon atoms, trifluoromethyl, methoxy and nitro, X' is selected from the group consisting of fluoro, chloro, bromo, iodo, methyl, trifluoromethyl and methoxy,
n is 0, 1 or 2 and
X in may be hydrogen when n is 1 or 2 and X' is a least one halogen in the 3-position and salts thereof.

The most closely related compounds in the literature are 1-aryl-3-carboxy-4,6-dialkylpyrid-2-ones and 1-aryl-3-carboxy-4,5,6-trialkylpyrid-2-ones which are the subject of U.S. Pat. No. 3,576,814.

Typical compounds within the scope of this invention include:

1-(4-aminophenyl)-3-carboxy-5(or 6)-methylpyrid-2-one
1-(4-fluorophenyl)-3-carboxy-5(or 6)-methylpyrid-2-one
1-(4-chlorophenyl)-3-carboxy-5(or 6)-methylpyrid-2-one
1-(4-bromophenyl)-3-carboxy-5(or 6)-methylpyrid-2-one
1-(4-iodophenyl)-3-carboxy-5(or 6)-methypyrid-2-one
1-(4-methylphenyl)-3-carboxy-5(or 6)-methylpyrid-2-one
1-(4-methoxyphenyl)-3-carboxy-5(or 6)-methylpyrid-2-one
1-(4-nitrophenyl)-3carboxy-5(or 6)-methylpyrid-2-one
1-(4-trifluoromethylphenyl)-3-carboxy-5(or 6)-methylpyrid-2-one
1-(4-bromonaphthyl)-3-carboxy-5(or 6)- methylpyrid-2-one
1-(4-fluoronaphthyl)-3-carboxy-5(or 6)-methylpyrid-2-one
1-(4-methylnaphthyl)-3-carboxy-5(or 6)-methylpyrid-2-one
1-(4-trifluoromethylnaphthyl)-3-carboxy-5(or 6)-methylpyrid-2-one
1-(4-methoxynaphthyl)-3-carboxy-5(or 6)-methylpyrid-2-one
1-(4-nitronaphthyl)-3-carboxy-5(or 6)-methylpyrid-2-one Based on plant growth regulatory activity and the tolerance of economic plants, preferred compounds of this invention are from the classes of 1-aryl-3-carboxy-5-methyl-pyrid-2-ones and 1-aryl-3-carboxy - 6 - methylpyrid-2-ones and their water-soluble salts.

Water soluble salts of the compounds of Formula I include the alkali metal salts, preferably the sodium and potassium derivatives; the ammonium; mono, di and trialkylammonium wherein each alkyl group may contain up to 4 carbon atoms, preferably methylammonium, dimethylammonium, trimethylammonium and triethylammonium; ethanolamine and propanolamine salts such as the 2-hydroxyethylammonium, 2 - hydroxypropylammonium, bis(2 - hydroxyethyl)ammonium and tris(2 - hydroxyethyl)- and quaternary ammonium salts such as tetramethylammonium and choline. Other useful salts include the alkaline earth salts, particularly the calcium and magnesium, aluminum, cadmium, copper, ferric, ferrous, manganese, nickel and zinc.

Different methods of preparation may be used depending on the position of the methyl group in the pyrid-2-one ring. The hydrolysis of the corresponding 3-cyano (or 3-carbalkoxy)pyrid-2-ones can be employed. Other methods of preparation which may be used are discussed below for the specific methylpyrid-2-one ring.

(A) Preparation of 1-aryl-5-methylpyrid-2-ones, $$\text{(II)}$$

One general method for the preparation of compounds of Formula II is by the following sequence of reactions:

$$(C_2H_5O)_2CHCHCH(OC_2H_5)_2 + CH_2(COOC_2H_5)_2$$
$$CH_3$$

$$\downarrow \text{acetic anhydride, anhydrous } ZnCl_2$$

$$C_2H_5O\ CH=CCH=C(COOC_2H_5)_2$$
$$CH_3$$
$$\text{(III)}$$

Formula III + $ArylNH_2 \xrightarrow{\text{alcohol}}$ $$ArylNHCH=CCH=C(COOC_2H_5)_2$$
$$CH_3$$
$$\text{(IV)}$$

Formula IV $\xrightarrow[\text{ethanol}]{\text{piperidine}}$ $$\text{(V)}$$

$$\downarrow \text{hydrolysis (acid or base)}$$

Formula II

In the above reactions Aryl is as previously defined.

The reaction of 1,1,3,3-tetraethoxy-2-methylpropane with diethyl malonate to give Formula III is an adaption of the procedure of British patent 1,049,031. The starting 1,1,3,3-tetraethoxy-2-methylpropane is described in Chemical Abstracts 54, 20870a (1960).

The aminolysis of diethyl 3-ethoxy-2-methylallylidenemalonate (Formula III) with an aniline to give Formula IV compounds is carried out by the general procedure described in British patent 1,049,031. The reaction is quite facile and often exothermic so is usually run in the range of 0–50° C., and preferably at 20–40° C., in an inert solvent. Suitable solvents are found in the hydrocarbon, especially aromatic hydrocarbons, and alcohol classes or dioxane or dimethylformamide. Alcohols, such as ethanol or isopropanol, are preferred.

The cyclization of the aniline derivatives of Formula IV to the pyrid-2-one ring is readily accomplished by reaction in the presence of piperidine usually in the presence of an alcohol solvent. The general method is described for related α-pyridones in British patent 1,049,031. Temperatures from 0–150° C. may be used but in the pyrid-2-ones of this invention the preferred temperature range is 50–100° C. and ethanol is the preferred solvent.

It is not necessary to isolate each intermediate before the subsequent reaction in the reaction sequence. That is, if desired, Formula III can be produced and without isolation can be reacted with the anilines and this reaction mixture without isolation of Formula IV compounds can be cyclized to the desired Formula II compounds.

The following examples are illustrative of the preparation of compounds of Formula II.

EXAMPLE 1

Preparation of 1-(4-chlorophenyl)-3-carboxy-5-methylpyrid-2-one (a) Preparation of diethyl 3-ethoxy-2-methylallylidenemalonate.

Diethyl malonate (168 g., 1.05 moles) was added to a stirred, refluxing solution of 10 g. of freshly fused zinc chloride in 430 g. (1.84 moles) of 1,1,3,3-tetraethoxy-2-methylpropane and 261.8 g. (3.6 moles) of acetic anhydride over a period of 30 minutes. The mixture was heated at reflux over night and then the lower boiling components were removed by distillation up to a vapor temperature of about 120° C. An additional 50 ml. of acetic anhydride were added and refluxing was continued for a total of 29 hours. The reaction mixture was distilled to give as a main fraction 168 g. of a yellow oil distilling at 124–150° C./0.2–0.35 mm. This was a 65.4% yield of diethyl 3-ethoxy-2-methylallylidenemalonate.

(b) Preparation of the ethyl ester of 1-(4-chlorophenyl)-3-carboxy-5-methylpyrid-2-one.

4-Chloroaniline (16.4 g., 0.129 mole) in 25 ml. of absolute ethanol was added dropwise to a stirred solution of 30 g. (0.117 mole) of diethyl 3-ethoxy-2-methylallylidenemalonate and 2 ml. of piperidine in 75 ml. of absolute ethanol. The mixture was stirred at ambient temperature for three days then heated to reflux temperature for 1.5 hrs. The solvent was removed to leave a viscous oil residue which solidified on standing. After recrystallization from hexane this gave 23 g. of solid which upon further recrystallization from an ether-pentane mixture gave white needles melting at 128–130° C. The solid was found by analysis to contain 61.8% C, 4.7% H, 12.3% Cl and 4.7% N; calculated for $C_{15}H_{14}ClNO$ is 61.7% C, 4.8% H, 12.2% Cl and 4.8% N. The solid is a 67% yield of the ethyl ester of 1-(4-chlorophenyl)-3-carboxy-5-methylpyrid-2-one.

(c) Preparation of 1-(4-chlorophenyl)-3-carboxy-5-methylpyrid-2-one.

(1) Acid hydrolysis

A mixture of the ethyl ester of 1-(4-chlorophenyl)-3-carboxy-5-methylpyrid-2-one (19 g., 0.0654 mole) and 175 ml. of concentrated hydrochloric acid was heated on a steam bath for 0.5 hr. The solution was poured into about 1 l. of ice water to give a yellow solid which after air drying melted at 183–185° C. The product was found to contain 59.0% C, 3.6% H, 13.6% Cl and 5.2% N, calculated for $C_{13}H_{10}ClNO_3$ is 59.2% C, 3.8% H, 13.5% Cl and 5.3% N. This was an 84% yield of 1-(4-chlorophenyl)-3-carboxy-5-methylpyrid-2-one.

(2) Base hydrolysis

A suspension of the ethyl ester of 1-(4-chlorophenyl)-3-carboxy-5-methylpyrid-2-one (0.5 g., 1.7 mmole) in 5 ml. of 20% aqueous sodium hydroxide was heated on a steam bath for 4 hrs. The slurry was then diluted to 30 ml. and heated 15 minutes longer. The hot solution was rapidly filtered through a glass wool plug. Ice (30 g.) was added to the filtrate which was then acidified with concentrated hydrochloric acid to give a white solid which was filtered off, washed and vacuum dried. The product was 0.28 g. melting at 184–186° C. It was found by analysis to contain 59.5% C, 3.8% H, 13.7% Cl and 5.2% N. The solid was a 62% yield of 1-(4-chlorophenyl)-3-carboxy-5-methylpyrid-2-one.

EXAMPLE 2

Preparation of 1-(3-chloro-4-methylphenyl)-3-carboxyl-5-methylpyrid-2-one (a) Preparation of the ethyl ester of 1-(3-chloro-4-methylphenyl)-3-carboxy-5-methylpyrid-2-one.—When 18.2 g. (0.129 mole) of 3-chloro-4-methylaniline was substituted in Example 1(b) for the 4-chloroaniline, there was obtained a quantitative yield of the ethyl ester of 1-(3-chloro-4-methylphenyl)-3-carboxy-5-methylpyrid-2-one as a dark viscous oil.

(b) Preparation of 1-(3-chloro-4-methylphenyl)-3-carboxy-5-methylpyrid-2-one.—The oil residue from part (a) was subjected to acid hydrolysis as in Example 1(c)(1). There was obtained 20 g. of a brown solid melting at 245–247° C. It was found by analysis to contain 60.7% C, 4.5% H, 13.2% Cl and 4.7% N; calculated for $C_{14}H_{12}ClNO_3$ is 60.5% C, 4.4% H, 12.8% Cl and 5.0% N. The product is a 56% yield of 1-(3-chloro-4-methylphenyl)-3-carboxy-5-methylpyrid-2-one.

(B) Preparation of 1-aryl-3-carboxy-6-methylpyrid-2-ones,

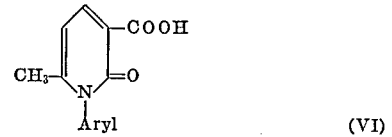

The following series of reactions may be used to prepare the compounds of Formula VI.

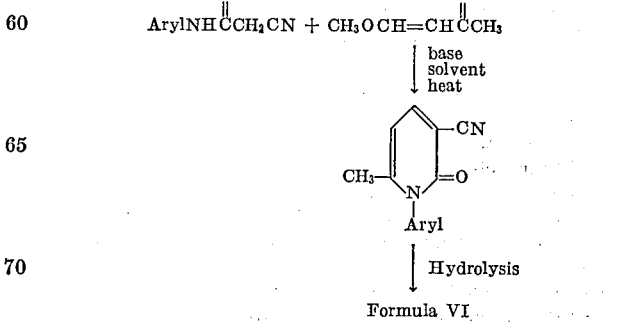

In the above reactions Aryl is as previously defined.

The starting cyanoacetanilides are well-known compounds, e.g. see U.S. Pat. 3,503,986. Under certain circumstances, it is possible to substitute the half ester-half anilide of malonic acid, e.g. ArylNHC(O)CH$_2$COOC$_2$H$_5$, for the cyanoacetanilides.

4-Methoxy-3-buten-2-one is a product of commerce. Other derivatives of actoacetaldehyde as well as the aldehyde itself may be used.

The base catalyst for the ring closure is preferably a heterocyclic amine, such as piperidine, imidazole or 1,4-diazabicyclo-[2.2.2]-octane or a trialkylamine. A catalyst such as sodium methoxide has been used with half malonic ester anilides.

Any inert solvent in which the reactants have a solubility of at least ten percent may be used. The half ethers of glycols are preferred solvents, e.g. such as those known commercially as Carbitols and Cellosolves.

The hydrolysis of the 3-cyano or 3-carboxylic esters of 6-methylpyrid-2-ones may be acid or base hydrolysis as discussed above under Example 1(d). Acid hydrolysis is preferred.

The following examples are illustrative of the preparation of compounds of Formula VI.

EXAMPLE 3

Preparation of 1-(3-methylphenyl)-3-carboxy-6-methylpyrid-2-one (a) Preparation of 1-(3-methylphenyl) - 3 - cyano-6-methylpyrid-2-one.—A reaction mixture consisting of 3′-methylcyanoacetanilide (87 g., 0.5 mole, melting point 128–132.5° C.), 4-methoxy - 3 - buten-2-one (100 g., 1 mole), 10 g. of 1,4-diazabicyclo-[2.2.2]octane and 400 ml. of 2-methoxyethanol was stirred at reflux temperature for 5 hours. Removal of the solvent left a residue of 220 g. of dark brown oil. The oil was dissolved in 500 ml. of methylene chloride and the solution was washed twice with an equal volume of dilute hydrochloric acid, twice with water, dried over anhydrous sodium sulfate and the solvent removed to give 191 g. of brown oil. This oil partially solidified and was filtered to give 19 g. of solid melting at 173.5–175° C., and at 174–176° C. after recrystallization from benzene. The solid was found by analysis to contain 75.2% C, 5.4% H and 12.3% N; calculated for C$_{14}$H$_{12}$N$_2$O is 75.0% C, 5.4% H and 12.5% N. The solid product is a 17% yield of 1-(3-methylphenyl)-3-cyano-6-methylpyrid-2-one.

(b) Hydrolysis to 1-(3-methylphenyl) - 3 - carboxy-6-methylpyrid-2-one.—1-(3-Methylphenyl)-3-cyano-6-methylpyrid-2-one (17 g., 0.075 mole) was hydrolyzed by heating on a steam bath with diluted sulfuric acid for about 16 hrs. Dilution with water and isolation of the solid followed by extraction with dilute sodium hydroxide and acidification of the alkaline filtrate gave 16.2 g. of solid melting at 168.5–170° C. This was found to contain by analysis 69.2% C, 5.5% H and 5.6% N; calculated for C$_{14}$H$_{13}$NO$_3$ is 69.1% C, 5.4% H and 5.8% N. The product is an 88% yield of 1-(3-methylphenyl)-3-carboxy-6-methylpyrid-2-one.

EXAMPLE 4

Preparation of 1-(4-n-butylphenyl)-3-carboxy-6-methylpyrid-2-one (a) 4′ - n - Butylcyanoacetanilide (64.8 g., 0.3 mole, melting at 151–153° C.) was reacted with 4-methoxy-3-buten-2-one by the procedure described above for Example 3. The product was 25 g. of solid which melted at 130.5–131.5° C. after recrystallization from carbon tetrachloride. It was found by analysis to contain 77.0% C, 7.0% H and 10.3% N; calculated for C$_{17}$H$_{18}$N$_2$O is 76.7% C, 6.8% H and 10.5% N. The solid product is a 31% yield of 1-(4-n-butylphenyl)-3-cyano-6-methylpyrid-2-one.

(b) The nitrile from part (a) above (12.7 g., 0.048 mole) was dissolved in 40 ml. of concentrated sulfuric acid and 12 g. of ice added with cooling to maintain the temperature below 50° C. The mixture was then heated on a steam bath for 16 hours. After cooling, the reaction mixture was poured into 400 ml. of ice water, filtered and residue treated with dilute sodium hydroxide and filtered. The filtrate was acidified to give 13.2 g. of solid melting at 128–129.5° C. This was found by analysis to contain 71.4% C, 6.8% H and 4.8% N; calculated for C$_{17}$H$_{19}$NO$_3$ is 71.6% C, 6.7% H and 4.9% N. The product is a 98% yield of 1-(4-n-butylphenyl)-3-carboxy-6-methylpyrid-2-one.

EXAMPLE 5

Preparation of 1-(4-chlorophenyl)-3-carboxy-6-methylpyrid-2-one

A solution of ethyl p-chloromalonanilate (24.1 g., 10.1 mmole), 4-methoxy-3-buten-2-one (10 g., 10.1 mmole), sodium methoxide (5.4 g., 10.1 mmole) in 200 ml. of ethanol was heated at reflux for 3 hours. The dark solution was poured into ice water and filtered. The filtrate was acidified and the resulting solid was recrystallized from ethanol to give 10 g. of solid melting at 229–232° C. The product was found by analysis to contain 59.3% C, 3.4% H and 5.2% N; calculated for

is 59.2% C, 3.8% H and 5.3% N. The solid is a 34% yield of 1 - (4-chlorophenyl)-3-carboxy-6-methylpyrid-2-one.

The salts of the carboxylic acids are readily made by several methods known in the art. For example, (a) one equivalent of carboxylic acid is suspended in 1,2-dimethoxyethane (glyme) and sodium hydride is added in increments. There is an evolution of hydrogen and the sodium salt usually precipitates and is filtered off and vacuum dried. If very little precipitate is formed this can be induced by the addition of anhydrous ether.

(b) the acid is suspended or dissolved in anhydrous methanol and titrated with one molar equivalent of sodium hydroxide or an alkoxide in methanol. The solvent is stripped off and the resulting sodium salt is vacuum dried. The salts may be characterized generally by NMR analysis. None of them melt at less than 250° C. The following are typical examples:

Example 6. The sodium salt of Example 1.
Example 7. The sodium salt of Example 2.
Example 8. The sodium salt of Example 3.
Example 9. The sodium salt of Example 4.
Example 10. The sodium salt of Example 5.

The compounds of this invention have been found to produce a variety of plant responses. These responses are observed when the compounds alone or in a carrier or as formulations are applied to the plant itself, as by foliar application, or to plant parts such as by seed treatment or to the environment or habitat of the plant, such as by soil drenching or soil incorporation. The most outstanding plantgrowth influencing property is suppression of growth. This is most commonly found to be a growth inhibitory action on the stem, i.e., stem elongation is inhibited. In other instances flowering or seed formation is altered. In other cases modification of leaves is noted. Sometimes, particularly at high dosages, a plant species may be herbicidally sensitive.

One type of test was used which was designed to give a preliminary evaluation of plant growth response to the chemicals. In this test, seeds of typical monocotyledonous and dicotyledonous plants were planted in individual 4 inch pots and two weeks thereafter the pots were drenched with an aqueous suspension of the test chemical at a rate of 10 pounds per acre. Two weeks and 4 weeks thereafter the plants were visually observed for percent inhibition as compared to untreated controls and for injury (on a 0=no effect to 10=complete kill scale) or other growth response.

Other soil drench tests were used for evaluating the plant growth regulating properties of the compounds of this invention. In these tests, seeds or plants were planted in pots and either immediately or at a given stage of growth the soil was watered with an aqueous solution or suspension containing the compound at given dosages in terms of pounds per acre. Growth responses were subsequently observed.

In one such test seeds of corn (*Zea mays* var. Golden Midget), wheat (*Triticum vulgare* var. Pennoll), barley (*Hordeum vulgare* var. Irie) and rice (*Oryza sativa* var. Bella Patna) were planted in 4 inch pots containing a sterile medium of two parts soil and one part humus. Soil drench solutions or suspension were prepared by dissolving a test compound in 1 ml. of acetone or water then diluting with water to a volume of 50 ml. Each test compound was then applied as a soil drench at 4 and 8 lbs./A. All treatments were applied at the time of planting. After treatment the pots were placed in greenhouse conditions and subirrigated when necessary. Two weeks after treatment, seedling height was measured and recorded as percent inhibition. Table I gives the results. Results with prior art Compound A, 1-(4-chlorophenyl)-3-carboxy-4,6-dimethylpyrid-2-one, and Compound B, the sodium salt of Compound A are included to demonstrate the reduction in phytotoxicity to economic crops of the monomethylpyrid-2-ones over the prior art 2,4-dimethylpyrid-2-ones.

TABLE I.—INHIBITION OF HEIGHT BY SOIL DRENCH TREATMENTS

| Example number | Dosage (lbs.) | Height (percent inhibition) | | | |
|---|---|---|---|---|---|
| | | Corn | Wheat | Rice | Barley |
| 2 | 4 | 0 | 0 | 0 | 0 |
|   | 8 | 0 | 0 | 0 | 0 |
| 3 | 4 | 0 | 0 | 0 | 0 |
|   | 8 | 0 | 0 | 0 | 0 |
| 4 | 4 | 0 | 0 | 0 | 0 |
|   | 8 | 0 | 0 | 0 | 0 |
| 5 | 4 | 0 | 0 | 0 | 0 |
|   | 8 | 0 | 0 | 0 | 0 |
| 7 | 4 | 0 | 0 | 0 | 0 |
|   | 8 | 0 | 0 | 0 | 0 |
| 8 | 4 | 0 | 0 | 0 | 0 |
|   | 8 | 0 | 0 | 0 | 0 |
| 9 | 4 | 0 | 0 | 0 | 0 |
|   | 8 | 0 | 0 | 0 | 0 |
| 10 | 4 | 0 | 0 | 0 | 0 |
|    | 8 | 0 | 0 | 0 | 0 |
| Comp. A | 4 | 15 | 46 | 61 | 45 |
|         | 8 | 24 | 54 | 83 | 60 |
| Comp. B | 4 | 11 | 39 | 59 | 42 |
|         | 8 | 20 | 50 | 74 | 50 |

In seed treatment tests an aqueous solution or suspension of the test compound was prepared and diluted to various percent concentrations. Seeds were then immersed in these preparations for about 20 hours, after which they were washed with water, planted in untreated soil, and the germination and growth subsequently observed.

In one such greenhouse test the free acids are neutralized with an equimolar amount of sodium hydroxide and dissolved in water to give a series of concentrations varying from 0.03% to 3%. Seeds of barley, oats and wheat were treated with these solutions as indicated above and planted. Three weeks after planting observations were made as to the number of germinated plants which had emerged and the height of these plants as compared to untreated controls. The percent inhibition was determined as the average of the percent inhibition in height of the germinated plant as compared to untreated controls and the percent inhibition in seed germination. A 100% inhibition indicates that the seeds did not germinate or that no plants appeared.

In another such test involving seed treatment, seeds of corn, wheat, barley and rice of the same varieties as those used in obtaining the data of Table I above were used. The same general procedure as described immediately above was used for the water soluble salts. After two weeks, plant height was measured and recorded as percent inhibition. Table II gives the results.

TABLE II.—INHIBITION OF CEREALS BY SEED TREATMENT

| Example | Plant species | Percent inhibition at— | | | | |
|---|---|---|---|---|---|---|
| | | .01 | .03 | .1 | .3 | 1.0 |
| 6 | Corn | 0 | 0 | 0 | 18 | 36 |
|   | Wheat | [1] NT | 0 | 0 | 5 | 29 |
|   | Barley | 6 | 0 | 13 | 13 | 56 |
|   | Rice | 0 | 0 | 0 | 0 | 14 |
| 7 | Corn | 0 | [2] NG | NG | NG | NG |
|   | Wheat | NG | 0 | 0 | NG | 0 |
|   | Barley | 0 | 12.9 | NG | NG | NG |
|   | Rice | 0 | 50 | 0 | 0 | 0 |
| 9 | Corn | 14.2 | 14.2 | NG | 0 | 0 |
|   | Wheat | 0 | 0 | 0 | 0 | 0 |
|   | Barley | 17.3 | 39.1 | NG | NG | NG |
|   | Rice | 0 | 0 | 0 | 0 | 0 |
| 10 | Corn | 7.1 | 28.5 | 42.5 | NG | NG |
|    | Wheat | 8.6 | 17.0 | 21.7 | 26.0 | 34.7 |
|    | Barley | 26.0 | 39.1 | NG | NG | NG |
|    | Rice | 12.5 | 25.0 | 37.5 | 50.0 | 56.3 |
| Compound B | Corn | 20.5 | 35.7 | 50.0 | NG | NG |
|            | Wheat | 8.6 | 21.7 | 30.4 | 47.8 | 52.1 |
|            | Barley | 39.1 | 52.1 | 56.5 | NG | NG |
|            | Rice | 37.5 | 50.0 | 60.5 | 75.0 | 91.3 |

[1] NT = Not treated.
[2] NG = Complete inhibition of germination

This test shows that the compounds of this invention are considerably less phytotoxic than the salts of the 3-carboxy-4,6-dimethylpyrid-2-ones, such as Compound B.

When the compounds of this invention are applied to plants or to the habitat of plants, they give a growth regulating response in the dosage range of about 0.01 to 30 pounds per acre (0.011 to 33 kilos per hectare). At the higher dosages, herbicidal responses may be manifested. Depending on the type of response desired, the amount will vary with the plant species to be treated. Generally the preferred range is from 0.05 to 15 pounds per acre. Seeds may be treated with the compounds themselves or with any concentration of a solution or formulation of them.

The compounds of this invention may be employed as plant growth response agents either individually or as a mixture of two or more of them. They also may be used in combination with other plant growth regulatory compounds such as maleic hydrazide, succinic acid 2,2-dimethylhydrazide, choline and its salts, (2-chloroethyl) trimethylammonium chloride, triiodobenzoic acid, tributyl - 2,4 - dichlorobenzylphosphonium chloride, polymeric N - vinyl - 2 - oxazolidinones, tri(dimethylaminoethyl) phosphate and its salts, and N-dimethylamino-1,2,3,6-tetrahydrophthalamic acid and its salts. The compounds of this invention may also be combined with a herbicide for use on plants which are not sensitive to the herbicide at weed controlling rates. For example, they may be combined with 2,4-D for use on monocotyledonous plants such as cereals and turf grasses, with 3',4'-dichloropropionanilide for use on rice or with 2,4-dichlorophenyl 4-nitrophenyl ether for use on rice and other cereals.

The compounds of this invention may be applied in liquid carriers. One preferred group of the compounds is the water soluble salts, in which case water is the preferred carrier. Nonphytotoxic organic solvents such as ketones, alcohols, glycols, dimethylformamide and dimethyl sulfoxide may be employed. If desired a surfactant such as a wetting agent may also be used and this usually constitutes a minor part (in general less than 10%) of the solution or formulation. The surface active agents may be anionic, cationic or non-ionic. For the water-soluble salts cationic and non-ionic surfactants are preferred. Commonly used surfactants are well-known in the art and may be found in John W. McCutcheon's publication "Detergents and Emulsifiers, 1969 Annual," John W. McCutcheon Inc., Morristown, New Jersey.

The compounds of this invention may be formulated in various ways as for example emulsifiable concentrates, wettable powders, dusts, granules and pellets. Usually for application to the plant or plant parts or the plant habitat, the formulations are extended with a suitable carrier. Emulsifiable concentrates are most usually extended with a liquid carrier such as water and dusts, granules and pellets are most usually extended with a solid carrier such as mineral clays.

Emulsifiable concentrates may be made by dissolving the compounds in an organic solvent and adding one or more solvent-soluble emulsifying agents. Suitable solvents are usually water-immiscible and may be found in the hydrocarbon, chlorinated hydrocarbon, ketone, ester, alcohol and amide classes of organic solvents.

Wettable powders may be made by incorporating the compounds in an inert, finely divided solid carrier along with a surfactant which may be one or more emulsifying, wetting, dispersing or spreading agents or blends of these. Suitable carriers may be found in the classes of clays, silicates, silicas, limes, carbonates and organic carriers.

Solid compositions in the form of dusts may be made by compounding the compounds of this invention with inert carriers conventionally employed for the manufacture of pesticidal dusts for agricultural use, such as talcs, finely particled clays, pyrophyllite, diatomaceous earth, magnesium carbonate or wood or walnut shell flours.

Granular or pelletized formulations may be made by incorporating the compounds into granular or pelletized forms of agronomically acceptable carriers such as granular clays, vermiculite, charcoal, ground corn cobs or bran.

The compounds of this invention have exhibited pre and/or postemergence herbicidal activity in standard greenhouse tests at 10 lbs./A.

The growth regulatory action of the compounds of the present invention may be advantageously employed in various ways. The production of shorter and thicker stems in cereal grains reduces the tendency toward lodging. Turf grasses may be maintained at a low height and the necessity for frequent mowing alleviated. The plant growth on embankments, such as roadsides, may be controlled to prevent erosion and at the same time maintain its aesthetic value. There may be an advantage in producing a dormant period in certain plants. The control of flowering and fruiting may be advantageous in the production of seedless fruit and for hybridization, e.g. with cereals such as corn or barley or with sorghum. Delaying the vegetative process or altering the time of flowering and fruiting may result in more advantageous harvest dates or increased flower, fruit and/or seed production. The chemical pruning of trees, shrubs, ornamentals and nursery stock may be beneficial. Other applications of the compounds of the present invention will suggest themselves to those skilled in the art of agriculture and horticulture.

We claim:

1. A compound of the formula

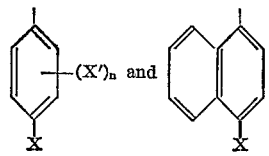

wherein the CH₃ group is in the 5-position or 6-position and Aryl is selected from the group consisting of

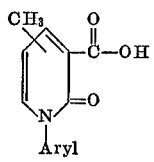

wherein X is selected from the group consisting of amino, fluoro, chloro, bromo, iodo, alkyl of 1 to 5 carbon atoms, trifluoromethyl, methoxy and nitro, X' is selected from the group consisting of fluoro, chloro, bromo, iodo, methyl, trifluoromethyl and methoxy, $n$ is 0 or 1 and X in

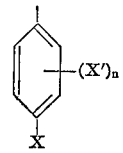

may be hydrogen when $n$ is 1 and X' is methyl in the 3-position, and non-phytotoxic salts thereof.

2. A compound according to claim 1 which is 1-(4-chlorophenyl)-3-carboxy-5-methylpyrid-2-one, and salts thereof.

3. A compound of claim 2 wherein the said salts are water-soluble salts.

4. The compound of claim 3 which is the sodium salt.

5. A compound according to claim 1 which is 1-(4-chlorophenyl)-3-carboxy-6-methylpyrid-2-one.

6. A compound according to claim 5 wherein the said salts are water-soluble salts.

7. The compound according to claim 6 which is the sodium salt.

8. A compound of the formula, and non-phytotoxic salts thereof,

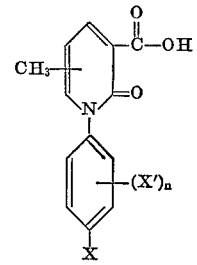

wherein n is 0 or 1,

X is selected from the group consisting of chloro and alkyl of 1 to 5 carbon atoms, except that X may be hydrogen when $n$ is 1 and X' is methyl in the 3-position, X' is selected from the group consisting of chloro and methyl, and the CH₃ group is in the 5- or 6-position.

9. A compound according to claim 8 in which X is methyl and (X')ₙ is chloro.

10. A water-soluble salt of a compound according to claim 9.

References Cited
UNITED STATES PATENTS

| | | | |
|---|---|---|---|
| 3,503,986 | 3/1970 | Seidel et al. | 260—295.5 R |
| 3,576,814 | 4/1971 | Seidel et al. | 260—295.5 R |
| 3,711,488 | 1/1973 | Bayer et al. | 260—295.5 R |

ALAN L. ROTMAN, Primary Examiner

U.S. Cl. X.R.

260—270 R, 295.5 B; 71—94